(12) United States Patent
Wakabayashi et al.

(10) Patent No.: US 9,878,525 B2
(45) Date of Patent: Jan. 30, 2018

(54) MANUFACTURING METHOD OF COMPOSITE FILM

(71) Applicant: ASAHI GLASS COMPANY, LIMITED, Chiyoda-ku (JP)

(72) Inventors: Hirokazu Wakabayashi, Chiyoda-ku (JP); Hiroshi Shimoda, Chiyoda-ku (JP)

(73) Assignee: ASAHI GLASS COMPANY, LIMITED, Chiyoda-ku (JP)

( * ) Notice: Subject to any disclaimer, the term of this patent is extended or adjusted under 35 U.S.C. 154(b) by 126 days.

(21) Appl. No.: 15/088,467

(22) Filed: Apr. 1, 2016

(65) Prior Publication Data

US 2016/0214361 A1 Jul. 28, 2016

Related U.S. Application Data

(63) Continuation of application No. PCT/JP2014/080609, filed on Nov. 19, 2014.

(30) Foreign Application Priority Data

Dec. 13, 2013 (JP) .................................. 2013-258040

(51) Int. Cl.
*B32B 41/00* (2006.01)
*B32B 37/00* (2006.01)
(Continued)

(52) U.S. Cl.
CPC .......... *B32B 37/0053* (2013.01); *B32B 17/06* (2013.01); *B32B 17/10036* (2013.01);
(Continued)

(58) Field of Classification Search
CPC .......... B32B 37/0053; B32B 17/10761; B32B 17/10036; B32B 37/10; B32B 17/06;
(Continued)

(56) References Cited

U.S. PATENT DOCUMENTS

2011/0097572 A1 4/2011 Yonekura et al.

FOREIGN PATENT DOCUMENTS

CN 102066281 5/2011
EP 2 298 707 A1 3/2011
(Continued)

OTHER PUBLICATIONS

Written Opinion dated Jan. 27, 2015 in PCT/JP2014/080609 filed on Nov. 19, 2014.
(Continued)

*Primary Examiner* — Michael N Orlando
*Assistant Examiner* — Joshel Rivera
(74) *Attorney, Agent, or Firm* — Oblon, McClelland, Maier & Neustadt, L.L.P.

(57) ABSTRACT

To provide a manufacturing method of a composite film for laminated glass, the method enabling the high-yield manufacture of the composite film that causes less appearance failure in the obtained laminated glass, while ensuring smooth workability. A manufacturing method of a composite film composed of a resin intermediate film and a plastic film for laminated glass, including: feeding the resin intermediate film with 0.04 to 0.4 N/cm tension and the plastic film, between a two rolls whose surface temperatures are 25 to 50° C., and pressing these to obtain a laminate; and feeding the laminate between a third roll whose surface temperature is 60° C. or higher and lower than Tg of a resin in the plastic film and a fourth roll whose surface temperature is lower than this by 15 to 30° C., so as to bring the plastic film into contact with the third roll, and pressing the laminate.

10 Claims, 2 Drawing Sheets

; CONVEYANCE DIRECTION OF WORKS

(51) Int. Cl.
  B32B 37/12    (2006.01)
  B32B 37/20    (2006.01)
  B32B 17/06    (2006.01)
  B32B 37/10    (2006.01)
  B32B 17/10    (2006.01)
  C09J 7/02     (2006.01)
  B29C 65/18    (2006.01)
  B29C 65/00    (2006.01)

(52) U.S. Cl.
  CPC ........ *B32B 17/10761* (2013.01); *B32B 37/10* (2013.01); *B32B 37/12* (2013.01); *B32B 37/203* (2013.01); *C09J 7/02* (2013.01); *B29C 65/18* (2013.01); *B29C 66/0242* (2013.01); *B29C 66/1122* (2013.01); *B29C 66/45* (2013.01); *B29C 66/71* (2013.01); *B29C 66/81457* (2013.01); *B29C 66/81465* (2013.01); *B29C 66/83413* (2013.01); *B29C 66/83415* (2013.01); *B29C 66/919* (2013.01); *B29C 66/91411* (2013.01); *B29C 66/91421* (2013.01); *B29C 66/91423* (2013.01); *B29C 66/91445* (2013.01); *B29C 66/91945* (2013.01); *B29C 66/949* (2013.01); *B32B 2309/02* (2013.01); *B32B 2309/10* (2013.01); *B32B 2315/08* (2013.01); *B32B 2367/00* (2013.01); *C09J 2203/318* (2013.01)

(58) Field of Classification Search
  CPC ... B32B 37/203; B32B 37/12; B32B 2367/00; B32B 2315/08; B32B 2309/10; B32B 2309/02; C09J 7/02; C09J 2203/318; B29C 66/91945; B29C 65/18
  USPC .......................... 156/64, 350, 351, 378, 379
  See application file for complete search history.

(56) References Cited

FOREIGN PATENT DOCUMENTS

| | | |
|---|---|---|
| JP | 2009-298661 | 12/2009 |
| JP | 2012-51220  | 3/2012  |

OTHER PUBLICATIONS

International Preliminary Report on Patentability and Written Opinion dated Jun. 23, 2016 in PCT/JP2014/080609 (submitting English translation only).

MANUFACTURING METHOD OF COMPOSITE FILM

CROSS-REFERENCE TO RELATED APPLICATIONS

This application is a continuation of prior International Application No. PCT/JP2014/080609, filed on Nov. 19, 2014 which is based upon and claims the benefit of priority from Japanese Patent Application No. 2013-258040, filed on Dec. 13, 2013; the entire contents of all of which are incorporated herein by reference.

TECHNICAL FIELD

The present invention relates to a manufacturing method of a composite film composed of a resin intermediate film and a plastic film, which is used as an intermediate bonding layer of laminated glass.

BACKGROUND

Laminated glass having a structure in which a pair of glass plates are bonded together by an intermediate bonding layer to be integrated is generally manufactured in such a manner that a resin intermediate film is sandwiched by a pair of glass plates to form a glass laminate, and this is subjected to high temperature and high pressure processing in an autoclave or the like. By this method, the pair of glass plates is bonded by heat sealing of the resin intermediate film to be the laminated glass.

As a technique to impart various kinds of functions such as infrared blocking to such laminated glass, there is known a technique in which two resin intermediate films with a plastic film having these functions therebetween are inserted between a pair of glass plates to bond the pair of glass plates by heat sealing similarly to the above. In this case, before being combined with the glass plates and subjected to high-temperature and high-pressure processing, the plastic film and the resin intermediate films are integrated in advance by compression bonding or the like to be a composite film. In some case, the composite film is prepared as a three-layer composite film in which the plastic film is sandwiched by two resin intermediate films, but is often prepared as a two-layer composite film in which the plastic film is laminated on one resin intermediate film.

The resin intermediate film and the plastic film are prepared as, for example, long scrolls in consideration of productivity, and are continuously subjected to roll compression bonding by a laminating apparatus or the like to be the composite film. However, the resin intermediate film used for manufacturing the laminated glass elongates when given a certain level of tension or more due to its property and when it is compression-bonded with the plastic film in this state, there occur problems such as that the resin intermediate film in the obtained composite film contracts to curl or the resin intermediate film peels off from the plastic film. Further, the resin intermediate film has problems of being likely to wrinkle during the roll compression boding if its tension is low, and losing emboss that the resin intermediate film usually has on its surface if being subjected to high-temperature compression bonding.

On the other hand, Patent Reference 1 (WO 2009/154060 A1) describes a method in which, in a case where laminated glass in which a plastic film is inserted similarly to the above and which uses glass plates formed in a curved shape is manufactured, resin intermediate films and the plastic film are bonded by pressing and heating to be a composite film after being laminated at a 10 to 25° C. temperature range for the purpose of preventing the plastic film from wrinkling. Incidentally Patent Reference 1 makes no mention of the aforesaid problem which occurs in manufacturing the composite film for laminated glass due to a load applied to the resin intermediate film.

SUMMARY OF THE INVENTION

It is an object of the present invention to provide a manufacturing method of a composite film composed of a resin intermediate film and a plastic film, which is used as an intermediate bonding layer of laminated glass, the method enabling the high-yield manufacture of the composite film that causes less appearance failure in the obtained laminated glass, while ensuring smooth workability.

Means for Solving the Problems

The present invention provides a manufacturing method of a composite film having the following structure.

[1] A manufacturing method of a composite film used as an intermediate bonding layer of laminated glass in which a pair of glass substrates are bonded via the intermediate bonding layer, the composite film being composed of a resin intermediate film and a plastic film, the plastic film containing, as a main body, a resin whose glass transition point is 70 to 250° C., and the manufacturing method including:

a step (a) of feeding the plastic film and the resin intermediate film which is kept at a 0.04 to 0.4 N/cm tension to a first laminating roll composed of a first roll and a second roll whose surface temperatures are adjusted to 25 to 50° C., so as to bring the plastic film into contact with the first roll and the resin intermediate film into contact with the second roll, and laminating the plastic film and the resin intermediate film by passing both the plastic film and the resin intermediate film between the both rolls of the first laminating roll in a pressurized state to obtain a laminate; and a step (b) of feeding the laminate to a second laminating roll composed of a third roll whose surface temperature is adjusted to 60° C. or higher and lower than the glass transition point of the resin in the plastic film and a fourth roll whose surface temperature is adjusted lower than the surface temperature of the third roll by 15 to 30° C., so as to bring the plastic film into contact with the third roll, and passing the laminate between the both rolls of the second laminating roll in a pressurized state to obtain the composite film.

[2] The manufacturing method according to [1], wherein, in the step (a), the plastic film is fed onto the first roll while kept at a 1.0 to 2.5 N/cm tension.

[3] The manufacturing method according to [1], wherein the resin intermediate film contains a plasticized polyvinyl acetal-based resin as a main component.

[4] The manufacturing method according to [1], wherein, in the step (a), the resin intermediate film is fed onto the second roll while kept at a 0.04 to 0.3 N/cm tension.

[5] The manufacturing method according to [1], wherein the resin intermediate film has a 0.3 to 0.8 mm thickness.

[6] The manufacturing method according to [1], wherein the resin as the main body of the plastic film is polyester.

[7] The manufacturing method according to [1], wherein the plastic film has a 25 to 200 µm thickness.

[8] The manufacturing method according to [1], wherein surfaces of the first roll and the third roll are made of metal, and surfaces of the second roll and the fourth roll are made of rubber.

[9] The manufacturing method according to [1], wherein the plastic film is an infrared reflective dielectric multilayer film in which a layer made of a resin having a high refractive index and a layer made of a resin having a low refractive index are alternately laminated, or an infrared reflective film-added plastic film having an infrared reflective film on one surface of a film-shaped plastic substrate.

According to the present invention, the high-yield manufacture of a composite film composed of a resin intermediate film and a plastic film, which is used as an intermediate bonding layer of laminated glass, is made possible while imparting, to the composite film, a quality enabling the suppression of the occurrence of an appearance failure in the obtained laminated glass, and while ensuring smooth workability.

DETAILED DESCRIPTION

Figure 1:
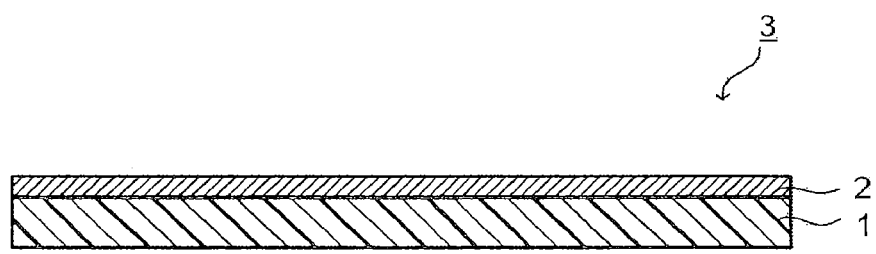
FIG. 1 is a sectional view of an example of a composite film obtained by the manufacturing method of the present invention.

Hereinafter, embodiments of the present invention will be described. It should be noted that the present invention is not limited to these embodiments, and these embodiments may be changed or modified without departing from the spirit and scope of the present invention.

The manufacturing method of the present invention is a manufacturing method of a composite film used as an intermediate bonding layer of laminated glass in which a pair of glass substrates are bonded via the intermediate bonding layer, the composite film being composed of a resin intermediate film and a plastic film containing, as a main body, a resin whose glass transition point (hereinafter, sometimes referred to as "Tg") is 70 to 250° C., and the method including the following step (a) and step (b).

A step (a) of feeding the plastic film and the resin intermediate film which is kept at a 0.04 to 0.4 N/cm tension to a first laminating roll composed of a first roll and a second roll whose surface temperatures are adjusted to 25 to 50° C., so as to bring the plastic film into contact with the first roll and the resin intermediate film into contact with the second roll, and laminating the plastic film and the resin intermediate film by passing the plastic film and the resin intermediate film between the both rolls of the first laminating roll in a pressurized state to obtain a laminate.

A step (b) of feeding the laminate to a second laminating roll composed of a third roll whose surface temperature is adjusted to 60° C. or higher and lower than the glass transition point of the resin in the plastic film and a fourth roll whose surface temperature is adjusted lower than the surface temperature of the third roll by 15 to 30° C., so as to bring the plastic film into contact with the third roll, and passing the laminate between the both rolls of the second laminating roll in a pressurized state to obtain the composite film.

Note that, to find the glass transition point (Tg), strain or stress that changes (oscillates) as the elapse of time is applied to a sample, and stress or strain generated by this is measured. In this specification, based on dynamic viscoelasticity measurement in which a mechanical property of the sample is measured, a peak of a loss tangent tan δ and a change point of a gradient of storage modulus Er are regarded as the glass transition point (Tg).

Further, the "laminating roll" refers to a means which is composed of a pair of rolls whose inter-roll distance is adjustable and which performs a predetermined process such as, for example, laminating, stretching, and compression bonding by having a workpiece pass between the rolls whose distance is adjusted to a predetermined value.

In the manufacturing method of the present invention, the step (a) is a step of laminating the plastic film and the resin intermediate film prepared separately, by using the first laminating roll, and in this specification, the step (a) is sometimes referred to as a laminating step. Further, the step (b) is a step of turning the laminate obtained in the step (a) into the composite film by thermal compression bonding by using the second laminating roll, and in this specification, the step (b) is sometimes referred to as a compression bonding step.

In the composite film thus obtained, the plastic film and the resin intermediate film are integrated in close adhesion to each other. For instance, as a value of adhesion strength evaluated by the following method in conformity with JIS K 6854-1, adhesion of the plastic film and the resin intermediate film in the composite film is preferably 0.5 to 2.5 N/20 mm, and more preferably 0.7 to 1.5 N/20 mm. When the value of the adhesion strength in the composite film falls within the above range, it is possible to fully suppress the occurrence of an appearance failure ascribable to the resin intermediate film or the plastic film in the obtained laminated glass. Further, this is preferable because this enables the high-yield manufacture of the laminated glass under good working efficiency.

(Method of Adhesion Test)
A resin intermediate film side of each composite film test piece prepared to have a 20 mm width and 150 mm length size is pasted on a slide plate by a double-sided adhesive tape, and its plastic film side is attached to a tensile tester so as to enable the peeling in a width direction of the test piece. A peel test is conducted in the width direction of the test piece at a 50 mm/minute tensile speed, and a curve of Force to Moving Distance with a test piece is gripped is obtained over a peel length (20 mm). Ten highest peak values (N) of a hunting force in the obtained curve are read, and their average value is calculated to obtain adhesion strength (N/20 mm).

A sectional view of an example of the composite film obtained by the manufacturing method of the present invention is illustrated in FIG. 1. The composite film 3 illustrated in FIG. 1 is structured to have a plastic film 2 on one main surface of a resin intermediate film 1. The resin intermediate film that the composite film according to the manufacturing method of the present invention has can be the same as a resin intermediate film which is generally used in the manufacture of laminated glass, that is, which is melted by high-temperature and high-pressure processing or the like to bond glass substrates together or a glass substrate and a plastic film together, and the like. The plastic film is a film containing, as its main body, a resin whose Tg is 70 to 250° C., and is generally inserted in order to add various kinds of functions such as infrared blocking to the laminated glass and does not have a bonding function that the resin intermediate film has. Accordingly, for example, in order to manufacture laminated glass by using the composite film 3, a resin intermediate film having the same function as that of the resin intermediate film 1 needs to be disposed on a plastic film 2 side of the composite film 3.

Figure 2:
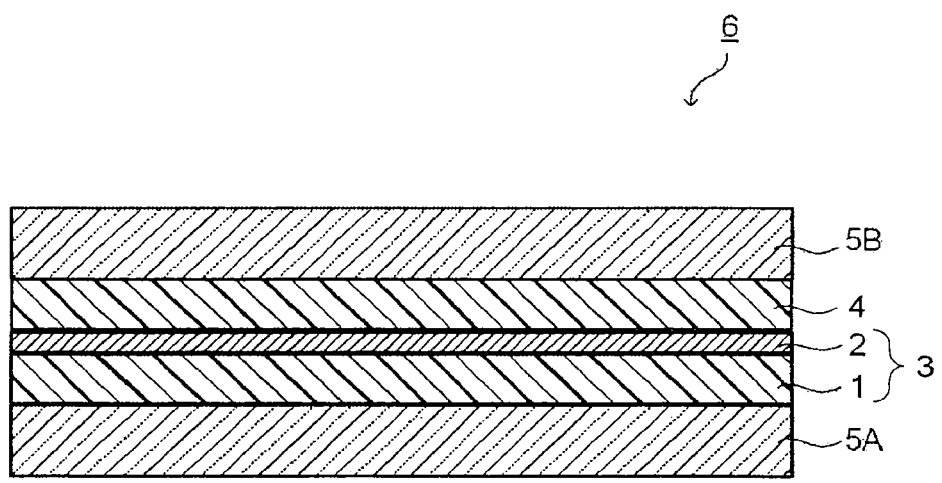
FIG. 2 is a sectional view of an example of laminated glass manufactured by using the composite film illustrated in FIG. 1.

A sectional view of an example of the laminated glass obtained by thus using the composite film 3 is illustrated in FIG. 2. The laminated glass 6 has a structure in which a pair of glass substrates 5A, 5B are bonded via the composite film 3 and a resin intermediate film 4, specifically, a structure in which the glass substrate 5A, the composite film 3, the resin intermediate film 4, and the glass substrate 5B are laminated in the order mentioned to be integrated. In the laminated glass 6, the composite film 3 is disposed so that the resin intermediate film 1 is in contact with the glass substrate 5A.

In this specification, the "intermediate bonding layer" of the laminated glass refers to the entire intermediate layer sandwiched by the pair of glass substrates in the laminated glass. The intermediate bonding layer may be composed of a single layer or may be composed of multiple layers. In the laminated glass 6 illustrated in FIG. 2, a layer of a combination of the composite film 3 and the resin intermediate film 4 corresponds to the intermediate bonding layer.

In the present invention, for example, a manufacture condition of the composite film composed of the resin intermediate film and the plastic film, which is used in the laminated glass as illustrated in FIG. 2, is done by two steps the laminating step (step (a)) and the compression bonding step (step (b)), and conditions of the respective steps are regulated as above, whereby it is possible to alleviate a load to the resin intermediate film during the manufacture of the composite film. Further, the composite film in which the plastic film and the resin intermediate film are sufficiently in close adhesion to each other is obtained. This can suppress the occurrence of curling and peeling in the composite film to suppress the occurrence of an appearance failure ascribable to the resin intermediate film or the plastic film in the obtained laminated glass. According to the manufacturing method of the present invention, the high-yield manufacture of the composite film under good working efficiency is enabled, and the high-yield manufacture of the laminated glass using the same under good working efficiency is also enabled.

Further, in completing the laminated glass, for example, even when the glass substrates 5A, 5B in the laminated glass 6 are formed in a curved shape with an about 0.5 to 5.0 m radius of curvature, no wrinkle occurs since the plastic film is sufficiently in close adhesion to the resin intermediate film, which enables the manufacture of the laminated glass having a good appearance.

The resin intermediate film and the plastic film forming the composite film which is used as the intermediate bonding layer of the laminated glass and to which the manufacturing method of the present invention is applied will be described.

(Resin Intermediate Film)

The resin intermediate film 1 in the composite film 3 may be any, provided that it has the function of bonding the glass substrate 5A and the plastic film 2 in the obtained laminated glass 6 illustrated in FIG. 2, for instance. As a constituent material of the resin intermediate film 1, the same material as a material forming a conventionally known intermediate film generally used in laminated glass is usable without any particular limitation. A specific example of the resin intermediate film 1 is a sheet-shaped film into which a composition containing the following thermoplastic resin as its main component is formed.

Here, the composition containing the thermoplastic resin as its main component refers to a composition in which a content ratio of the thermoplastic resin occupying the whole solid content in the composition is 50 mass % or more. The resin intermediate film obtained from this composition is a resin film containing the thermoplastic resin as its main component, that is, containing the thermoplastic resin at a ratio of 50 mass % or more to the entire resin intermediate film. Incidentally, the resin intermediate film 1 is generally manufactured as a long scroll by continuous production.

The thermoplastic resin is not particularly limited, provided that it enables the integration when, for example, the composition containing this thermoplastic resin as its main component is formed into a pair of sheet-shaped resin intermediate films and the pair of resin intermediate films with the plastic film therebetween is inserted between the pair of glass substrates to form the laminated glass. When it is used in vehicle laminated glass, particularly a windshield, the thermoplastic resin is preferably one that can achieve a 70% or more of visible light transmittance when the laminated glass is produced so that visibility is sufficiently ensured. Specific examples of the thermoplastic resin are thermoplastic resins conventionally used for an intermediate film, such as a plasticized polyvinyl acetal-based resin, a plasticized polyvinylchloride-based resin, a saturated polyester-based resin, a plasticized saturated polyester-based resin, a polyurethane-based resin, a plasticized polyurethane-based resin, an ethylene-vinyl acetate copolymer-based resin, and an ethylene ethyl acrylate copolymer-based resin.

Among these, the plasticized polyvinyl acetal-based resin is suitably used since it enables to obtain the resin intermediate film 1 having excellent balance among various properties such as excellent transparency, weather resistance, strength, adhesive strength, penetration resistance, impact energy absorbency, moisture resistance, a heat shielding property, and a sound insulating property. These thermoplastic resins may be used by themselves, or two kinds or more of them may be used in combination. "Plasticized" in the above plasticized polyvinyl acetal-based resin means that it is platicised by a plasticizer being added thereto. This also applies to the other plasticized resins.

The aforesaid polyvinyl acetal-based resin is not particularly limited, but a polyvinyl formal resin obtained through a reaction of polyvinyl alcohol (hereinafter, sometimes referred to as "PVA" when necessary) and formaldehyde, a polyvinyl acetal resin in a narrow sense obtained through a reaction of PVA and acetaldehyde, a polyvinyl butyral resin (hereinafter, sometimes referred to as "PVB" when necessary) obtained through a reaction of PVA and n-butylaldehyde, and the like are usable, and among these, PVB is suitably used because it enables to obtain the resin intermediate film 1 having more excellent balance among various properties such as excellent transparency, weather resistance, strength, adhesive strength, penetration resistance, impact energy absorbency, moisture resistance, a heat shielding property, and a sound insulating property. These polyvinyl acetal-based resins may be used by themselves, or two kinds or more of them may be used in combination.

PVA used in the synthesis of the polyvinyl acetal-based resin is not particularly limited but preferably has an average polymerization degree of 200 to 5000, and more preferably 500 to 3000. The polyvinyl acetal-based resin is not particularly limited, but preferably has an acetalization degree of 40 to 85 mol %, and more preferably 50 to 75 mol %. The polyvinyl acetal-based resin preferably has a residual acetyl group amount of 30 mol % or less, and more preferably 0.5 to 24 mol %.

The plasticizer used for obtaining the plasticized resin, preferably, the plasticized polyvinyl acetal-based resin, specifically for plasticizing the polyvinyl acetal-based resin is not particularly limited, but examples thereof are organic acid ester-based plasticizers such as monobasic organic acid ester-based plasticizers and poly-basic organic acid ester-based plasticizers, phosphoric acid-based plasticizers such as organic phosphoric acid-based plasticizers and organic phosphorous acid-based plasticizers, and the like.

An amount of the plasticizer used to obtain the aforesaid plasticized resin, for example, the plasticized polyvinyl acetal-based resin, differs depending on the average polymerization degree, the acetalization degree, the residual acetyl group amount, and so on of the polyvinyl acetal-based resin and is not particularly limited, but 10 to 80 parts by mass of the plasticizer to 100 parts by mass of the polyvinyl acetal-based resin is preferable. If an addition amount of the plasticizer to 100 parts by mass of the polyvinyl acetal-based resin is less than 10 parts by mass, the plasticization of the polyvinyl acetal-based resin sometimes becomes insufficient, leading to a difficulty in forming (film forming), and on the contrary, if the addition amount of the plasticizer to 100 parts by mass of the polyvinyl acetal-based resin is over 80 parts by mass, strength of the obtained resin film sometimes becomes insufficient as the resin intermediate film 1.

The thermoplastic resin-containing composition used for fabricating the resin intermediate film 1 contains the thermoplastic resin, preferably the plasticized polyvinyl acetal-based resin, as the main component of its entire solid content, and according to various kinds of purposes, it may contain one kind or two kinds or more of various kinds of additives such as, for example, an adhesion regulator, a coupling agent, a surface-active agent, an antioxidant, a heat stabilizer, a light stabilizer, an ultraviolet absorbent, an infrared absorbent, a fluorescer, a dehydrating agent, an antifoaming agent, an antistatic agent, and a flame retarder, within a range not obstructing the effect of the present invention. These additives are contained uniformly in the whole resin intermediate film 1.

Incidentally, when the laminated glass 6 is manufactured, the resin intermediate film 4 is used together with the composite film 3 composed of the resin intermediate film 1 and the plastic film 2. The resin intermediate film 1 and the resin intermediate film 4 may be formed of different kinds of materials but are preferably formed of the same material. Further, a thickness of the resin intermediate film 1 is not particularly limited, provided that it is such a thickness that enables the integration as the laminated glass 6 when the resin intermediate film 1 is combined with the plastic film 2 to be the composite film 3, and further by using the resin intermediate film 4, the plastic film 2 is sandwiched between the resin intermediate film 1 and the resin intermediate film 4, and the resultant is inserted between the glass substrates 5A, 5B, and normal processing is performed.

Specifically, the thickness of the resin intermediate film 1 is preferably 0.3 to 0.8 mm similarly to a thickness of each layer of a pair of intermediate films of a type sandwiching a plastic film which type is generally used for laminated glass and the like, and the total thickness of the resin intermediate film 1 and the resin intermediate film 4 is preferably 0.7 to 1.5 mm. When the thickness of the resin intermediate film 1 is less than 0.3 mm or the total thickness with the resin intermediate film 4 is less than 0.7 mm, strength of the intermediate bonding layer sometimes becomes insufficient, and on the contrary, when the thickness of the resin intermediate film 1 is over 0.8 mm or the total thickness with the resin intermediate film 4 is over 1.5 mm, a phenomenon that the pair of glass substrates 5A, 5B between which this is sandwiched dislocate from each other, that is, what is called a plate dislocation phenomenon may occur in the main bonding (main compression bonding) step by an autoclave when the laminated glass is fabricated.

It should be noted that the resin intermediate film 1 is not limited to a single layer structure. For example, a multilayer resin film, disclosed in JP 2000-272936 A, which is used for the purpose of improving sound insulating performance and in which resin films different in properties (different in loss tangent) are laminated may be used as the resin intermediate film 1.

(Plastic Film)

The plastic film 2 in the composite film 3 is not particularly limited, provided that it is a plastic film containing, as its main body, a resin whose Tg is 70 to 250° C. The plastic film 2 is generally a functional plastic film which is inserted in order to impart a specific function to laminated glass. Examples of the specific function are an infrared reflection function, an ultraviolet reflection function, and the like.

Such a functional plastic film may be a simple plastic film or may be a functional film-added plastic film in which a functional film is formed on a film-shaped plastic substrate, provided that it has the aforesaid function. When the plastic film is a simple plastic film, the plastic film may be composed of a single layer or multiple layers. In this specification, the term "plastic film" is used as a concept including the functional film-added plastic film unless otherwise noted.

Further, the resin as the main body of the plastic film refers to a resin forming the plastic film when the plastic film is a simple plastic film, and refers to a resin forming a plastic film as a substrate when the plastic film is a functional film-added plastic film. In the manufacturing method of the present invention, Tg of the resin as the main body of the plastic film is 70 to 250° C. Such a plastic film has rigidity, and its modulus of elasticity at 80 to 90° C. can be within a range of 1.0 to 2.5 GPa, for instance. According to the manufacturing method of the present invention, by performing the compression bonding step (step (b)) after the resin intermediate film is laminated with the plastic film having the aforesaid rigidity while fully adjusting tension of the resin intermediate film in the step (a), it is possible to alleviate a load to the resin intermediate film during the manufacture of the composite film, and further it is possible to ensure adhesion between the plastic film and the resin intermediate film in the obtained composite film.

Specific examples of the resin with 70 to 250° C. Tg as the main body of the plastic film are resins whose Tg is 70 to 250° C. out of resins such as polycarbonate, polyester, an acrylic resin, polyimide, polyethersulfon, polysulfone, polyarylate, nylon, aliphatic polyolefin, a cycloolefin polymer, a fluorocarbon resin, polystyrene (PS), polyurethane, and so on.

The acrylic resin as the aforesaid resin is preferably polymethyl methacrylate (PMMA) or the like. Further, polyester is preferably polyethylene terephthalate (PET), polyethylene naphthalate (PEN), polybutylene naphthalate (BEN), or the like. Note that, in this specification, PMMA, PET, PEN, BEN, and the like are each used as a term including not only a homopolymer composed only of any of these polymers but also a copolymer manufactured by using various kinds of comonomers together with a main raw material in each polymer, and a modified polymer. Further, the resin with 70 to 250° C. Tg as the main body of the plastic film in the present invention is preferably polyester whose Tg is 75 to 100° C. among the aforesaid resins, in view of cost and durability.

Among resin films obtained by using these resins, a resin film fabricated by a stretching method such as a PET film has relatively high strength, can suppress a defect such as film folding or the like which occurs in handling and so on during the laminating process with the resin intermediate film, and also can suppress the generation of a spherical crystal due to heating to suppress cloudiness, and thus is preferable as the plastic film when used as the simple plastic film, or as the film-shaped plastic substrate in the functional film-added plastic film.

A thickness of the plastic film, that is, a thickness of the plastic film used as the simple plastic film or a thickness of the film-shaped plastic substrate in the functional film-added plastic film is preferably 25 to 200 μm, and more preferably 50 to 120 pun, in view of easiness in handling the film and compatibility to a deaeration step during the manufacture of the laminated glass.

The function that the plastic film has is preferably the infrared reflection function. When the plastic film is an infrared reflective film, examples of the plastic film are an infrared reflective film generally used in laminated glass, for example, an infrared reflective film-added plastic film (i) in which an infrared reflective film is disposed on one main surface of a film-shaped plastic substrate, an infrared reflective dielectric multilayer film (ii) in which a layer made of a resin having a high refractive index and a layer made of a resin having a low refractive index are alternately laminated, and so on.

Examples of the infrared reflective film in the infrared reflective film-added plastic film (i) are conventionally known infrared reflective films such as single-layer or multilayer infrared reflective films including a dielectric multilayer film, a liquid crystal alignment film, an infrared reflector-containing coating film, and a metal film. A thickness of the infrared reflective film is preferably 100 to 500 nm, and more preferably 150 to 450 nm.

The dielectric multilayer film formed as the infrared reflective film on the film-shaped plastic substrate in the infrared reflective film-added plastic film (i) has a structure in which a high refractive index dielectric film and a low refractive index dielectric film are alternately laminated. Preferably, for the dielectric films, two kinds appropriately different in the refractive index are selected in combination out of metallic compounds such as $TiO_2$, $Nb_2O_5$, $Ta_2O_5$, $SiO2$, $A_2O_3$, $ZrO_2$, $MgF_2$, and the like and they are used as a high refractive index dielectric and a low refractive index dielectric.

Further, regarding the number of layers of the laminated dielectric films, when the total number of layers of the high refractive index dielectric film and the low refractive index dielectric film is three or less, the reflection in an infrared range is insufficient, and when the number of the layers is over twelve, manufacturing cost becomes high, and increasing the number of the layers increases a film stress to lower adhesion to the plastic substrate or curls the plastic substrate, and therefore, the number of the layers of the laminated dielectric films is preferably not less than four nor more than eleven. As the number of the layers increases, the maximum value of the reflection in the infrared range becomes larger and color of a visible range becomes close to achromatic color, so that a preferable infrared reflective film is obtained.

A reflection wavelength band and reflectance of the infrared reflective film composed of such a dielectric multilayer film can be designed depending on the kind of the used dielectrics, the layer thickness of each of the layers, and the number of the layers. Therefore, a desired infrared reflective film can be designed by appropriately selecting the kind of the dielectrics, the layer thickness, and the number of the layers according to infrared reflective performance required for its use.

An example of a method of forming the dielectric multilayer film on the film-shaped plastic substrate is a method in which it is disposed on one of the main surfaces of the plastic substrate being a surface where to form the infrared reflective film, by using any of existing techniques such, for example, as magnetron sputtering, electron-beam evaporation, vacuum deposition, and chemical vapor deposition.

The liquid crystal alignment film formed as the infrared reflective film on the film-shaped plastic substrate in the infrared reflective film-added plastic film (i) is specifically a film obtained in such a manner that a liquid crystal compound that can be aligned to a helical structure or a lattice structure is aligned to the helical structure or the lattice structure on the plastic substrate, and this alignment state is fixed. Liquid crystal phases presenting these structures include a cholesteric liquid crystal phase, a ferroelectric liquid crystal phase, an antiferroelectric liquid crystal phase, and a blue phase, and any of these is usable. Further, substances other than the aforesaid substances can exhibit selective reflectivity if having a cyclic structure whose size is about half to a tenth of a size of a wavelength of light that is to be reflected, and thus a photonic crystal having what is called a stopband in a wavelength range of the relevant light is also usable.

An example of a method of forming the liquid crystal alignment film on the film-shaped plastic substrate is a method in which a plastic substrate having an alignment film on its one main surface is prepared, a liquid composition obtained through the dissolving of a liquid crystal compound and, as required, other optional components in an organic solvent is applied as a coating liquid on the alignment film, the liquid crystal compound is aligned to a helical structure or a lattice structure, and this alignment state is fixed. Alternatively, the alignment is enabled by magnetic field, electric field alignment, or a shear stress operation, without using the alignment film.

The aforesaid alignment is generally caused by heating. A temperature of the heating alignment is generally equal to or higher than a crystal phase-nematic phase transition temperature of the liquid crystal compound or equal to or lower than a nematic phase-isotropic phase transition temperature. The heating alignment time is not particularly limited, but is preferably within a range of about ten seconds to three minutes. The alignment may be fixed at the heating alignment temperature or at a temperature that is lower than this and within a range not causing the precipitation of the crystal.

The infrared reflective dielectric multilayer film (ii) is a dielectric optical film including at least two resin layers and having the structure in which the layer made of the resin having the high refractive index and the layer made of the resin having the low refractive index are alternately laminated.

The resins forming the resin layers may be isotropic or may be birefringent. The resin layers each are preferably made of a birefringent resin, and more preferably the dielectric multilayer film is designed so that a Brewster's angle (angle at which reflectance of p-polarized light becomes zero) is very large or does not exist with respect to a resin layer boundary surface.

A combination of the resins forming the layer made of the resin having the high refractive index and the layer made of the resin having the low refractive index is not particularly limited, provided that it is a combination of two kinds of transparent resins or more different in refractive index out of the aforesaid resins whose Tg is 70 to 250° C. Examples of a preferable combination is a combination of two different kinds of polyesters, a combination of polyester and one kind selected from an acrylic resin, polystyrene, an fluorocarbon resin, and the like. Incidentally, when necessary, three kinds of resins or more may be used to fabricate the infrared reflective dielectric multilayer film (ii).

Specifically, the combination of the resins forming the layer made of the resin having the high refractive index and the resin forming the layer made of the resin having the low refractive index in the infrared reflective dielectric multilayer film (ii) is preferably a combination of PEN and PMMA, PET and PMMA, PEN and PS, PET and PS, PEN and PET, PEN and PETG (copolymer of PET using second glycol (generally cyclohexanedimethanol)), or the like.

The infrared reflective dielectric multilayer film (ii) can be fabricated by a conventionally known method described in, for example, J P 2002-509279 A, such as a method in which the aforesaid resins are combined so that a resin sheet in which two kinds of resin layers different in refractive index are alternately laminated is obtained, they are extruded simultaneously, and the obtained laminated sheet is stretched as required. A thickness of each of the resin layers and the number of the layers of the infrared reflective dielectric multilayer film (ii) are appropriately adjusted according to a required reflection property. The total thickness of the infrared reflective dielectric multilayer film (ii) is preferably 25 to 200 pin, and more preferably 50 to 120 μm as described above.

The manufacturing method of the present invention is applied to the composite film composed of the resin intermediate film and the plastic film which are described above. Hereinafter, the manufacturing method of the present invention will be described with reference to the drawings.

The manufacturing method of the present invention may be a continuous-type manufacturing method or may be a batch-type manufacturing method, provided that it can apply a predetermined tension separately to the plastic film and the resin intermediate film in the step (a). Note that the continuous type refers to a method in which the plastic film and the resin intermediate film are prepared as long scrolls, and the both sequentially fed out from the respective scrolls are continuously made into a composite film and the composite film is further taken up by a destination to which it is conveyed, so that the composite film is also obtained as a long scroll. The batch type refers to a method in which the plastic film and the resin intermediate film which are each cut into a predetermined shape are made into the composite film each time. The manufacturing method of the present invention is preferably the continuous type method in view of manufacturing efficiency. Hereinafter, an embodiment where the method of the present invention is applied to the continuous type manufacture will be described, but this is not restrictive.

Figure 3:
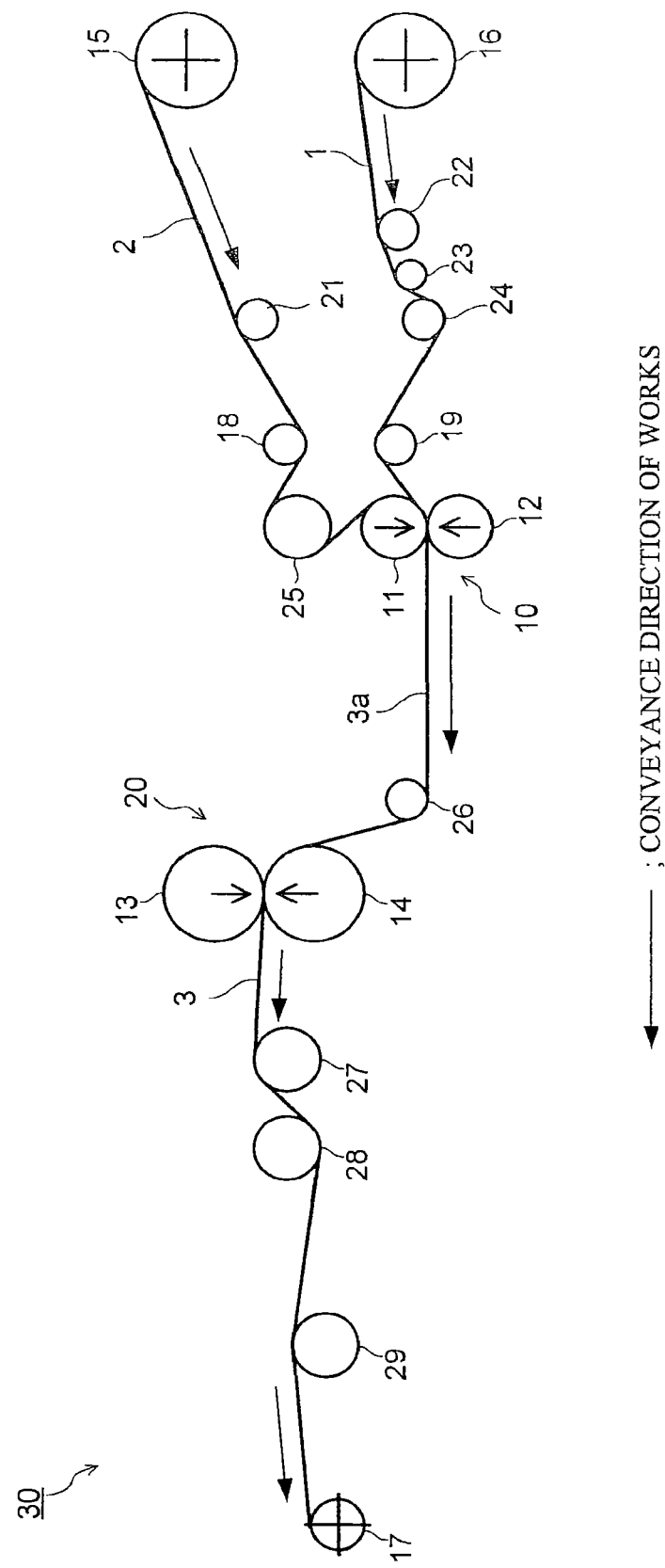
FIG. 3 is a schematic sectional view of an example of a laminating apparatus used for the manufacturing method of the present invention.

In order to perform the manufacturing method of the composite film in the present invention by the continuous method, it is suitable to use a laminating apparatus capable of continuously making the plastic film and the resin intermediate film into the composite film under the manufacturing conditions of the aforesaid step (a) and step (b), for example, a laminating apparatus whose schematic sectional view is illustrated in FIG. 3.

The laminating apparatus 30 illustrated in FIG. 3 has: two feed parts, that is, a first feed part 15 and a second feed part 16; a first laminating roll 10 composed of a first roll 11 and a second roll 12; a second laminating roll 20 composed of a third roll 13 and a fourth roll 14; and a take-up part 17 in order from an upstream side from which works are conveyed. The first to fourth rolls 11 to 14 each have a means (not illustrated) for adjusting its surface temperature. Further, the first laminating roll 10 and the second laminating roll 20 are designed as nip rolls capable of applying a pressure to the works when they pass between the rolls.

The laminating apparatus 30 further has support rolls 12 to 25 so that the works wound off from the first and second feed parts 15, 16 respectively can be fed to the first laminating roll 10, and also has, in conveyance paths of the respective works, a first tension pickup 18 and a second tension pickup 19 for measuring tensions of the respective works. It also has support rolls 26 to 29 so that the works are conveyed to the second laminating roll 20 after passing through the first laminating roll 10, pass through the roll 20, and thereafter are conveyed to the take-up part 17.

The conveyance of the works in the laminating apparatus 30 is done by the second laminating roll 20 and the take-up part 17 being rotated in a conveyance direction. The first laminating roll 10 and the support rolls 21 to 29 are rotatably set so as to rotate in accordance with the conveyance of the works. From the first and second feed parts 15, 16 up to the second laminating roll 20, the tensions of the works during the conveyance can be adjusted by a force being applied to the works in the first and second feed parts 15, 16 in a direction opposite the conveyance direction of the works. Further, from the second laminating roll 20 up to the take-up part 17, the tensions of the works can be adjusted by a rotational torque of the take-up part 17. Hereinafter, a method of continuously manufacturing the composite film in the embodiment of the present invention by using the laminating apparatus 30 will be described.

Step (a)

An step (a) is a step of feeding the plastic film 2 so that it comes into contact with the first roll 11 and feeding the resin intermediate film 1 kept at a 0.04 to 0.4 N/cm tension so that it comes into contact with the second roll 12, while adjusting the surface temperatures of the first roll 11 and the second roll 12 in the first laminating roll 10 to 25 to 50° C., and passing them between the first roll 11 and the second roll 12 in a pressurized state, to obtain a laminate 3a in which the plastic film 2 and the resin intermediate film 1 are laminated.

In order to perform the step (a), for example, the scroll of the plastic film 2 is set on the feed part 15 and the scroll of the resin intermediate film 1 is set on the feed part 16, in the laminating apparatus 30.

The plastic film 2 wound off from the scroll of the plastic film 2 set on the feed part 15 passes through the support roll 21, the first tension pickup 18, and the support roll 25 to be fed to the first laminating roll 10 so as to come into contact with the first roll 11.

At the first tension pickup 18, the tension applied to the plastic film 2 between the feed part 15 and the first laminating roll 10 (hereinafter, represented by "T2") is measured. The tension of the plastic film 2 fed to the first laminating roll 10 in the step (a) refers to the above-described tension T2 applied to the plastic film 2 between the feed part 15 and the first laminating roll 10, and a value of T2 is preferably 1.0 to 2.5 N/cm and more preferably 1.1 to 2.0 N/cm, though depending on a material and a thickness of the plastic film 2. When the value of the tension T2 applied to the plastic film 2 is within the aforesaid range, the occurrence of wrinkles and slackening can be easily suppressed when it is laminated with the resin intermediate film 1 in the step (a), which is preferable.

More specifically, the tension T2 of the plastic film 2 is preferably 1.0 to 2.0 N/cm and more preferably 1.1 to 1.7 N/cm when, for example, a plastic film with a 75 to 125 μm thickness containing PET as its main body is used as the plastic film 2.

Meanwhile, the resin intermediate film 1 wound off from the scroll of the resin intermediate film 1 set on the feed part 16 passes through the support rolls 22 to 24 and the second tension pickup 19 to be fed to the first laminating roll 10 so as to come into contact with the second roll 12.

At the second tension pickup 19, the tension applied to the resin intermediate film 1 between the feed part 16 and the first laminating roll 10 (hereinafter, represented by "T1") is measured. The tension of the resin intermediate film 1 fed to the first laminating roll 10 in the step (a) refers to the above-described tension T1 applied to the resin intermediate film 1 between the feed part 16 and the first laminating roll 10, and a value of T1 is set to 0.04 to 0.4 N/cm. The value of T1 is preferably 0.04 to 0.3 N/an and more preferably 0.04 to 0.25 N/cm. In the present invention, by regulating the value of T1 within the above range, it is possible to alleviate a load to the resin intermediate film 1 in the step (a) and suppress the occurrence of curling and peeling in the composite film obtained through the step (b) performed next.

More specifically, the tension T1 of the resin intermediate film 1 is preferably 0.04 to 0.2 N/cm and more preferably 0.04 to 0.1 N/cm when, for example, a resin intermediate film 1 with a 0.3 to 0.8 mm thickness containing plasticized PVB as its main component is used as the resin intermediate film 1.

Here, a conveyance speed of the plastic film 2, the resin intermediate film 1, the laminate 3a, and the composite film 3 is constant during a period in which the plastic film 2 and the resin intermediate film 1 are wound off from the feed parts 15, 16 respectively to be conveyed to the first laminating roll 10, and after they are made into the laminate 3a by being laminated in the first laminating roll 10, the laminate 3a is further conveyed to the second laminating roll 20 and is subjected to thermal compression bonding in the second laminating roll 20 to be the composite film 3, and the composite film 3 is finally taken up by the take-up part 17, and this conveyance speed is preferably 0.1 to 6.0 m/minute and more preferably 1.0 to 3.0 m/minute. When the conveyance speed of the plastic film 2, the resin intermediate film 1, the laminate 3a, and the composite film 3 is within the above range, the stable conveyance is possible in view of rigidity of the films, which is preferable.

In the first laminating roll 10, the plastic film 2 fed so as to come into contact with the first roll 11 as described above and the resin intermediate film 1 fed so as to come into contact with the second roll 12 as described above are laminated when passing between the first roll 11 and the second roll 12 to be the laminate 3a.

The surface temperature of the first roll 11 in the first laminating roll 10 is adjusted to fall within a range of 25 to 50° C. The surface temperature of the first roll 11 is preferably 30 to 45° C. and more preferably 40 to 45° C. Further, the time of the contact of the plastic film 2 with the first roll 11 is preferably about 5 to 20 seconds and more preferably 10 to 20 seconds. Incidentally, the surface of the first roll 11 is preferably made of metal in view of surface flatness. The metal may be of any kind.

The adjustment of the surface temperature of the first roll 11 can be done by a method generally implemented in an ordinary laminating roll for plastic films, and examples thereof are a method of heating the first roll 11 by dielectric heating, a method of heating it by a heater installed inside, a method of disposing a flow path of a medium inside and making an externally sent heating medium flow in the flow path, and so on. A size of the first roll 11 is not particularly limited, provided that its width is equal to or more than a width of the plastic film 2 but its diameter is preferably about 150 to 300 mm and more preferably about 200 to 250 mm.

Incidentally, a surface temperature of the plastic film 2 when it is laminated with the resin intermediate film 1 in the first laminating roll 10 is preferably within a temperature range of 20 to 50° C., more preferably 25 to 45° C., and especially preferably 25 to 40° C.

Further, when the functional film-added plastic film is used as the plastic film 2, the plastic film 2 is fed to the first laminating roll 10 so that the functional film comes into contact with the resin intermediate film 1, that is, so that the film-shaped plastic substrate comes into contact with the first roll 11.

In the step (a), by setting the surface temperature of the first roll 11 and preferably the contact time of the plastic film 2 with the first roll 11 within the aforesaid ranges, the surface temperature of the plastic film 2 is adjusted to the aforesaid preferable range, which enables the smooth lamination with the resin intermediate film 1, with the occurrence of wrinkles, slackening, and so on being suppressed.

The surface temperature of the second roll 12 in the first laminating roll 10 is adjusted to fall within the range of 25 to 50° C. similarly to the aforesaid surface temperature of the first roll 11. The surface temperature of the second roll 12 is preferably 40 to 50° C. and more preferably 40 to 45° C. Incidentally, the surface temperature of the first roll 11 and the surface temperature of the second roll 12 may be equal or may be different. Further, the contact time of the resin intermediate film 1 with the second roll 12 is preferably about 2 to 15 seconds and more preferably 2 to 10 seconds.

The surface of the second roll 12 is preferably made of rubber in view of the preventing the resin intermediate film 1 from having difficulty in peeling off due to its close adhesion to this surface, and so on. As the kind of the rubber, silicone rubber, urethane rubber, or the like is preferable.

The adjustment of the surface temperature of the second roll 12 can be done by a method similar to the method for adjusting the surface temperature of the first roll 11. A size of the second roll 12 is not particularly limited, provided that its width is equal to a width of the resin intermediate film 1 or more, but its diameter is preferably about 200 to 500 mm and more preferably about 250 to 400 mm.

Incidentally, a surface temperature of the resin intermediate film 1 when it is laminated with the plastic film 2 in the first laminating roll 10 is preferably within a temperature range of 20 to 45° C., more preferably 25 to 45° C., and especially preferably 25 to 40° C.

By setting the surface temperature of the second roll 12 and preferably the contact time of the resin intermediate film 1 with the second roll 12 within the aforesaid ranges, the surface temperature of the resin intermediate film 1 is adjusted to the aforesaid preferable range, which enables the smooth lamination with the plastic film 2, with the occurrence of wrinkles, slackening, and so on being suppressed.

The first laminating roll 10 is designed as the nip roll capable of applying the pressure to the works passing between the first roll 11 and the second roll 12. In the laminating step (step (a)), the pressurization by the first laminating roll 10 is indispensable. As for a condition of the pressurization, the pressurization is preferably done with a linear pressure of about 0.05 to 0.4 MPa when the stacked resin intermediate film 1 and plastic film 2 pass between the aforesaid rolls. The linear pressure is more preferably about 0.1 to 0.3 MPa. By setting the linear pressure within the aforesaid range, an adhesion state of the resin intermediate film 1 and the plastic film 2 in the obtained laminate 3a can be easily made high enough to prevent the peeling during the conveyance, which is preferable.

The laminate 3a thus obtained in the step (a) is conveyed from the first laminating roll 10 to the second laminating roll 20 where the next step (b) is performed. The adhesion state of the resin intermediate film 1 and the plastic film 2 in the laminate 3a only needs to be high enough to prevent the occurrence of the peeling during the conveyance, and for example, adhesion strength in the aforesaid adhesion test conducted in conformity with JIS K 6854-1 is preferably within a range of 0.05 to 0.1 N/20 mm.

Incidentally, during the conveyance from the first laminating roll 10 to the second laminating roll 20, the resin intermediate film 1 is in a state of being held by the plastic film 2, and it can be said that almost no influence by the tension occurs. Further, the support roll 26 is disposed in a conveyance path from the first laminating roll 10 to the second laminating roll 20 in the laminating apparatus 30 illustrated in FIG. 3 for the purpose of adjusting a wrap angle on the fourth roll 14 in the second laminating roll 20. In the manufacturing method of the present invention, it is not essential that the works pass through a support roll between the first laminating roll and the second laminating roll, but the laminate preferably passes through a support roll in view of the adjustment of a feed angle and so on of the laminate to the second laminating roll, that is, the adjustment of the contact time of the laminate with the third roll and the fourth roll, and so on.

Step (b)

A step (b) is a thermal compression bonding step of feeding the laminate 3a between the third roll 13 whose surface temperature is adjusted to 60° or higher and lower than Tg of the resin in the plastic film 2 and the fourth roll 14 whose surface temperature is adjusted lower than the surface temperature of the third roll 13 by 15 to 30° C., in the second laminating roll 20, so as to bring the plastic film 2 into contact with the third roll 13, and passing the laminae 3a between the both rolls 13, 14 in a pressurized state to obtain the composite film 3.

In order to obtain the composite film 3 in the step (step (b)), the second laminating roll 20 is set as the nip roll capable of applying the pressure to the works passing between the third roll 13 and the fourth roll 14. In the compression bonding step (b), the pressurization by the second laminating roll 20 is indispensable, and the pressurization with a linear pressure of about 2.0 to 7.0 MPa is preferably performed when the laminate 3a passes between the aforesaid both rolls 13, 14. The linear pressure is more preferably about 3.0 to 6.0 MPa.

In the step (b), by setting the surface temperature of the third roll 13 and the surface temperature of the fourth roll 14 to the aforesaid ranges respectively, fabricating the composite film 3 in a smooth state in which the occurrence of wrinkles, slackening, and so on is suppressed, and further in this state, setting the linear pressure applied to the laminate 3a when it passes between the both rolls 13, 14 to the aforesaid range, it is possible to expect an effective improvement of the adhesion strength in the obtained composite film 3. Preferably, it can be expected that the adhesion strength in the above-indicated range can be imparted.

The surface temperature of the third roll 13 in the second laminating roll 20 is adjusted to fall within the range of 60° C. or higher and lower than Tg of the resin in the plastic film 2 as described above. A lower limit of the surface temperature of the third roll 13 is preferably 62° C. An upper limit of the surface temperature of the third roll 13 is preferably lower than Tg of the resin in the plastic film 2 by 5° C., and more preferably by 10° C. Further, the contact time of the plastic film 2 of the laminate 3a with the third roll 13 is preferably about 5 to 30 seconds, and more preferably 10 to 20 seconds. Incidentally, a surface of the third roll 13 is preferably made of metal in view of flatness of the surface similarly to the surface of the first roll 11. The metal may be of any kind.

The adjustment of the surface temperature of the third roll 13 can be done by a method similar to the method for adjusting the surface temperature of the first roll 11. A size of the third roll 13 is not particularly limited, provided that its width is equal to or more than a width of the laminate 3a, but its diameter is preferably about 250 to 500 mm, and more preferably about 300 to 400 mm.

Incidentally, a surface temperature of the plastic film 2 in the laminate 3a in the second laminating roll 20 is preferably within a temperature range of 50 to 75° C., more preferably 55 to 70° C., and especially preferably 65 to 70° C.

In the step (b), by setting the surface temperature of the third roll 13 and preferably the contact time of the plastic film 2 in the laminate 3a with the third roll 13 within the aforesaid ranges, the surface temperature of the plastic film 2 is adjusted to the aforesaid preferable range, which enables the smooth thermal compression bonding of the plastic film 2 and the resin intermediate film 1 in the laminate 3a, with the occurrence of wrinkles, slackening, and so on being suppressed. Further, thermal contraction, a refractive index change, and so on of the plastic film 2 are also suppressed, which can suppress the occurrence of an appearance failure in the obtained laminated glass.

The surface temperature of the fourth roll 14 in the second laminating roll 20 is adjusted to fall within a temperature range lower than the surface temperature of the third roll 13 by 15 to 30° C. The surface temperature of the fourth roll 14 is preferably a temperature lower than the surface temperature of the third roll 13 by 15 to 25° C. and more preferably by 15 to 20° C. Further, the contact time of the resin intermediate film 1 of the laminate 3a with the fourth roll 14 is preferably about 5 to 30 seconds and more preferably 10 to 30 seconds.

Incidentally, the surface of the fourth roll 14 is preferably made of rubber in view of preventing the resin intermediate film 1 from having difficulty in peeling off due to its close adhesion to this surface, and so on, similarly to the aforesaid surface of the second roll 12. As a kind of the rubber, silicone rubber, urethane rubber, or the like is preferable.

The adjustment of the surface temperature of the fourth roll 14 can be done by a method similar to the method for adjusting the surface temperature of the first roll 11. A size of the fourth roll 14 is not particularly limited, provided that its width is equal to the width of the laminate 3a or more, but its diameter is preferably about 200 to 500 mm and more preferably about 300 to 400 mm.

Incidentally, a surface temperature of the resin intermediate film 1 in the laminate 3a in the second laminating roll 20 is preferably within a temperature range of 30 to 50° C., more preferably 35 to 45° C., and especially preferably 40 to 45° C.

By setting the surface temperature of the fourth roll 14 and preferably the contact time of the resin intermediate film 1 in the laminate 3a with the fourth roll 14 within the aforesaid ranges in the step (b), the surface temperature of the resin intermediate film 1 is adjusted to the aforesaid preferable range, which enables the smooth thermal compression bonding of the plastic film 2 and the resin intermediate film 1 in the laminate 3a, with the occurrence of wrinkles, slackening, and so on being suppressed.

According to the laminating apparatus 30 illustrated in FIG. 3, the composite film 3 thus obtained through the compression bonding step (step (b)) performed subsequently to the laminating step (step (a)) passes through the support rolls 27 to 29 to be taken up by the take-up part 17.

The composite film thus obtained by the manufacturing method of the present invention is a composite film having good workability, with the occurrence of its curling and peeling being suppressed, since a load to the resin intermediate film during the manufacture is alleviated. Further, the composite film has sufficient adhesion between the plastic film and the resin intermediate film. Using such a composite film to manufacturer laminated glass makes it possible to obtain laminated glass whose appearance failure ascribable to the resin intermediate film or the plastic film is suppressed is obtained. Further, it is possible to manufacture the laminated glass with high yields under good working efficiency. Incidentally, the composite film obtained by the manufacturing method of the present invention can be applied to the laminated glass as follows, for instance, by a generally used known technique.

For example, in order to obtain the laminated glass 6 illustrated in FIG. 2, the resin intermediate film 4 similar to the resin intermediate film 1 that the composite film 3 has is stacked on the plastic film 2 of the composite film 3, and this is inserted between the pair of glass substrates 5A, 5B to prepare a laminated glass precursor.

This laminated glass precursor is put in a vacuum bag such as a rubber bag, the vacuum bag is connected to an exhaust system, preliminary bonding (preliminary compression bonding) is performed at an about 70 to 0.110*C temperature while pressure-reduction suction (deaeration) is performed so that a pressure in the vacuum bag becomes a pressure reduction degree of about −65 to −100 kPa (absolute pressure about 36 to 1 kPa), and thereafter the laminated glass precursor subjected to the preliminary bonding is put into an autoclave, and by performing the main bonding (main compression bonding) by heating and pressurizing under a condition of an about 120 to 150° C. temperature and an about 0.98 to 1.47 MPa pressure, the laminated glass 6 can be obtained.

EXAMPLES

Hereinafter, the present invention will be concretely described, taking examples, but the present invention is not limited by these examples. Example 1 to Example 5 are the examples and Example 6 to Example 10 are comparative examples. For the examples, the following resin intermediate film, plastic film, and laminating apparatus were used.

Resin intermediate film 1: Saflex RK111 (brand name, manufactured by Solutia Inc., plasticized PVB film (thickness: 381 μm, scroll with width: 600 mm))
Plastic film 2: PET film with 100 μm thickness, manufactured by Mitsubishi Plastics, Inc. (Tg: 78° C., scroll with width: 600 mm)
[Apparatus]
A laminating apparatus similar to that illustrated in FIG. 3 was used. Note that its specifications are as follows.
(First Laminating Roll 10)
First roll 11: diameter 200 mm, metal roll, dielectric heating roll
Second roll 12: diameter 200 mm, metal roll whose surface is covered by silicone rubber having a 10 mm thickness, dielectric heating roll
(Second Laminating Roll 20)
Third roll 13: diameter 300 mm, metal roll, dielectric heating roll
Fourth roll 14: diameter 300 mm, metal roll whose surface is covered by silicone rubber having a 10 mm thickness, dielectric heating roll
Note that surface temperatures of the first to fourth rolls are controllable within a temperature deviation ±3° C. by dielectric heating.

Example 1

The plastic film 2 and the resin intermediate film 1 were wound off from the first feed part 15 and the second feed part 16 respectively and were conveyed to the first laminating roll 10 while tension T2: 1.20 N/cm was applied to the plastic film 2 and tension T1: 0.17 N/cm was applied to the resin intermediate film 1. In the first laminating roll 10, the surface temperature of the first roll 11 was controlled to 50° C. and the surface temperature of the second roll 12 was controlled to 40° C. The plastic film 2 and the resin intermediate film 1 were fed to the first laminating roll 10 so that the former came into contact with the first roll 11 and the latter came into contact with the second roll 12, and when the both pass between the first roll 11 and the second roll 12 in a stacked state, they were pressed with a linear pressure of 0.3 MPa, whereby a laminate 3a was obtained.

A conveyance speed of the resin intermediate film, the plastic film, the laminate, and a composite film from the feed parts 15, 16 to the take-up part 17 via the first laminating roll 10 and the second laminating roll 20 was set to a constant speed of 1.5 m/minute.

The plastic film and the resin intermediate film were conveyed to the second laminating roll 20 as the laminate 3a in which they were in close adhesion to a degree high enough for them not to peel off. In the second laminating roll 20, the third roll 13 and the fourth roll 14 were heated to 60° C. and 43° C. respectively. A position of the support roll 26 disposed on an upstream side of the second laminating roll 20 was adjusted so that the laminate 3a was in contact with the fourth roll 14 for 6.8 seconds before passing through the second laminating roll 20. The laminate 3a was fed to the second laminating roll 20 so that the plastic film 2 came into contact with the third roll 13. In the second laminating roll 20, the laminate 3a was pressed with a linear pressure of 3 MPa when passing between the third roll 13 and the fourth roll 14, whereby a composite film 3-1 of Example 1 was obtained. The obtained composite film 3-1 was taken up by the take-up part 17 to be a scroll.

Example 2

A composite film 3-2 was fabricated in the same manner as in Example 1 except that the surface temperatures of the first roll 11 and the second roll 12 were changed to 30° C. respectively and the surface temperature of the third roll 13 was changed to 70° C.

Example 3

A composite film 3-3 was fabricated in the same manner as in Example 1 except that the surface temperatures of the first roll 11 and the second roll 12 in were changed to 25° C. respectively and the surface temperature of the third roll 13 was changed to 70° C.

Example 4

A composite film 3-4 was fabricated in the same manner as in Example 1 except that the surface temperatures of the first roll 11 and the second roll 12 were changed to 25° C. respectively and the tension T1 of the resin intermediate film 1 and the tension T2 of the plastic film 2 were changed to 0.04 N/cm and 0.80 N/cm respectively.

Example 5

A composite film 3-5 was fabricated in the same manner as in Example 1 except that the surface temperatures of the first roll 11 and the second roll 12 were changed to 25° C. respectively, the surface temperature of the third roll 13 was changed to 60° C. and the tension T1 of the resin intermediate film 1 was changed to 0.30 N/cm.

Example 6

A composite film 3-6 was fabricated in the same manner as in Example 1 except that the tension T1 of the resin intermediate film 1 was changed to 1.20 N/cm and the surface temperature of the third roll 13 was changed to 70° C.

Example 7

A composite film 3-7 was fabricated in the same manner as in Example 1 except that the surface temperature of the first roll 11 was changed to 60° C. and the surface temperatures of the second roll 12 and the third roll 13 were changed to 70° C. respectively.

Example 8

A composite film 3-8 was fabricated in the same manner as in Example 1 except that the surface temperature of the first roll 11 was changed to 60° C., the surface temperatures of the second roll 12 and the third roll 13 were changed to 70° C. respectively, and the tension T1 of the resin intermediate film 1 was changed to 1.20 N/cm.

Example 9

A composite film 3-9 was fabricated in the same manner as in Example 1 except that the surface temperature of the third roll 13 was changed to 100° C.

Example 10

A composite film 3-10 was fabricated in the same manner as in Example 1 except that the resin intermediate film 1 and the plastic film 2 passed through the first laminating roll, with the adjustment of the surface temperatures of the first roll 11 and the second roll 12 and the pressurization which were performed in Example 1 not being performed, and further the surface temperature of the third roll 13 was set to 70° C.

Table 1 presents the surface temperatures of the first roll 11 to the fourth roll 14, values of the tension T1 of the resin intermediate film 1 and the tension T2 of the plastic film 2 from the feed parts 15, 16 to the first laminating roll 10, and the linear pressures in the first laminating roll 10 and the second laminating roll 20, in Example 1 to Example 10.

TABLE 1

| | Roll surface temperature [° C.] | | | | Laminating roll linear pressure [MPa] | | Tension [N/cm] | |
|---|---|---|---|---|---|---|---|---|
| | First | Second | Third | Fourth | First | Second | T1 | T2 |
| E1 | 50 | 40 | 60 | 43 | 0.3 | 3.0 | 0.17 | 1.20 |
| E2 | 30 | 30 | 70 | 43 | 0.3 | 3.0 | 0.17 | 1.20 |
| E3 | 25 | 25 | 70 | 43 | 0.3 | 3.0 | 0.17 | 1.20 |
| E4 | 25 | 25 | 60 | 43 | 0.3 | 3.0 | 0.04 | 0.80 |
| E5 | 25 | 25 | 60 | 43 | 0.3 | 3.0 | 0.30 | 1.20 |
| E6 | 50 | 40 | 70 | 43 | 0.3 | 3.0 | 1.20 | 1.20 |
| E7 | 60 | 70 | 70 | 43 | 0.3 | 3.0 | 0.17 | 1.20 |
| E8 | 60 | 70 | 70 | 43 | 0.3 | 3.0 | 1.20 | 1.20 |
| E9 | 50 | 40 | 100 | 43 | 0.3 | 3.0 | 0.17 | 1.20 |
| E10 | 25 | 25 | 70 | 43 | 0 | 3.0 | 0.17 | 1.20 |

E1 to E10 = Example 1 to Example 10

[Evaluation]

Regarding the composite films 3-1 to 3-10 obtained in the above Example 1 to Example 10, appearance was evaluated by the following method, and adhesion between the resin intermediate film and the plastic film and a shrinkage percentage of the resin intermediate film were measured. Further, pieces of laminated glasses were fabricated and their appearance was evaluated.

(Appearance)

In each of the obtained composite films, a 100 m range continuous in a length direction in the entire 600 mm width range was set as an evaluation range and the appearance was visually evaluated based on the following criteria Table 2 presents results and also indicates what a defect is, if any.
○: No defect such as wrinkle and floating (state where the resin intermediate film and the plastic film are separated without being compression-bonded) is recognized in the entire evaluation range.
Δ: Wrinkle, floating, or the like is recognized in part of the evaluation range.
X: Wrinkle, floating, or the like is recognized in a wide range in the evaluation range.

(Adhesion Strength)

The adhesion strength was measured by the above-described adhesion test method conforming to JIS K 6854-1. Incidentally, test pieces of the adhesion test were fabricated, with their width direction being set as a MD direction of the composite film. Here, the MD direction of the composite film refers to the length direction of the composite film. A width direction of the composite film is a TD direction.

(Shrinkage Percentage)

After the composite films obtained in the above were left in the state of the scrolls in a 23° C. and 50% RH environment for 24 hours, the composite films were each cut as they were into an about 200 mm square, and the shrinkage percentages in the MD direction and the TD direction of the resin intermediate films were measured by the following method. As the shrinkage percentage of the resin intermediate film measured by this method is larger, problems such as the curling of the composite film and the peeling between the resin intermediate film and the plastic film are more likely to occur. In view of working efficiency when the laminated glass is manufactured, absolute values of the shrinkage percentages in the MD direction and the TD direction are both preferably 3.5% or less, more preferably 3.0% or less, and especially preferably 2.5% or less.

(1) First, the length in the MD direction and the length in the TD direction of each of the about 200 mm square composite films obtained in the above by the cutting are accurately measured. Values of these are regarded as a length (Xmd) in the MD direction and a length (Xtd) in the TD direction of the resin intermediate film in the composite film.

(2) Thereafter, the composite films are each separated into the resin intermediate film and the plastic film. Immediately after the separation, a length (Ymd) in the MD direction and a length (Ytd) in the TD direction of each of the obtained resin intermediate films are measured.

(3) Based on the length (Xmd) in the MD direction and the length (Xtd) in the TD direction of the resin intermediate film, and the length (Ymd) in the MD direction and the length (Ytd) in the TD direction of the resin intermediate film after it is peeled off in each of the composite films, which are obtained in the above (1) and (2), the shrinkage percentages (%) in the MD direction and in the TD direction are found by the following expressions. Note that the shrinkage percentage in the TD direction becomes a negative value since the resin intermediate film elongates in the TD direction after being peeled off.

shrinkage percentage($MD$)(%)=($Xmd-Ymd$)/$Xmd$×100 shrinkage percentage($TD$)(%)=($Xtd-Ytd$)/$Xtd$×100

(Appearance of Laminated Glass)

Among the composite films obtained in the above, the composite films of Example 1 to Example 5 and Example 9 which were good in the adhesion strength, the shrinkage percentage of the resin intermediate film, and the appearance were each used to fabricate laminated glass and their appearance was evaluated by the following methods.

The composite films were each cut into a 300×300 mm size. Saflex RK111 (brand name, manufactured by Solutia, Inc., PVB film) which is the same as the resin intermediate film 1 was cut into the same size as that of the above composite films, and was stacked on a plastic film side of each of the composite films. These were each sandwiched between two soda lime glass plates (300×300 mm, plate thickness: 2 mm), the resultant was put into a vacuum bag, the vacuum bag was connected to an exhaust system, and preliminary bonding (preliminary compression bonding) was performed at an about 120° C. temperature while pressure-reduction suction (deaeration) was performed so that a pressure in the vacuum bag became a pressure reduction degree of about −76 kPa. Laminated glass precursors having subjected to the preliminary bonding were put into an autoclave, and by performing the main bonding (main compression bonding) by heating and pressurizing under a condition of an about 140° C. temperature and an about 1.3 MPa pressure, the pieces of laminated glass were obtained.

The appearance of the obtained pieces of laminated glass was visually evaluated based on the following criteria.

◯: The appearance is good with no problem (undulation, orange peel, and so on) in all the viewing angles.

Δ: The appearance is good when viewed in a limited angle, but it cannot be said that there is no problem in all the viewing angles.

X: Problems are recognized in many viewing angles.

(Comprehensive Evaluation)

Those in which the adhesion strength was 0.8 N/20 mm or more, the absolute values of the shrinkage percentages of the resin intermediate film were 3.2% or less both in the MD direction and the TD direction, and the appearance was good in the composite film, and the appearance of the laminate glass was evaluated as "◯" were rated as "◯" in the comprehensive evaluation. Those in which at least one of the above problems was recognized were rated as "X". Those rated as "◯" in the comprehensive evaluation each can be a composite film with the occurrence of the appearance failure being suppressed when the laminated glass was fabricated by using this. Further, it is possible to manufacture the laminated glass with high yields while ensuring smooth workability. Evaluation results obtained in the above are presented in Table 2.

TABLE 2

|  | Composite film | | | | | |
|---|---|---|---|---|---|---|
|  | Adhesion strength [N/20 mm] | Shrinkage percentage of resin intermediate film [%] | | Appearance | Appearance of laminated glass | Comprehensive evaluation |
|  |  | MD direction | TD direction |  |  |  |
| E1 | 1.8 | 3.0 | −1.8 | ◯ | ◯ | ◯ |
| E2 | 1.0 | 2.8 | −1.6 | ◯ | ◯ | ◯ |
| E3 | 0.9 | 2.8 | −1.7 | ◯ | ◯ | ◯ |
| E4 | 0.8 | 2.8 | −1.6 | ◯ | ◯ | ◯ |
| E5 | 1.0 | 3.2 | −1.8 | ◯ | ◯ | ◯ |
| E6 | 1.8 | 10.0 | −8.0 | ◯ | — | x |
| E7 | 0.9 | 3.0 | −1.9 | x (Vertical wrinkle) | — | x |
| E8 | 1.0 | 11.8 | −6.9 | ◯ | — | x |
| E9 | 1.6 | 2.9 | −1.9 | ◯ | x | x |
| E10 | 0.9 | 2.9 | −1.8 | Δ (Floating of center part) | — | x |

E1 to E10 = Example 1 to Example 10

What is claimed is:

1. A manufacturing method of a composite film, the manufacturing method comprising:

(a) feeding a plastic film comprising, as a main body, a resin whose glass transition point is 70 to 250° C. and a resin intermediate film which is kept at a 0.04 to 0.4 N/cm tension to a first laminating roll comprising a first roll and a second roll whose surface temperatures are adjusted to 25 to 50° C., so as to bring the plastic film into contact with the first roll and the resin intermediate film into contact with the second roll, and laminating the plastic film and the resin intermediate film by passing both the plastic film and the resin intermediate film between the first and second rolls of the first laminating roll in a pressurized state to obtain a laminate; and (b) feeding the laminate to a second laminating roll comprising a third roll whose surface temperature is adjusted to 60° C. or higher and lower than the glass transition point of the resin in the plastic film and a fourth roll whose surface temperature is adjusted lower than the surface temperature of the third roll by 15 to 30° C., so as to bring the plastic film into contact with the third roll, and passing the laminate between the third and fourth rolls of the second laminating roll in a pressurized state to obtain the composite film.

2. The manufacturing method according to claim 1, wherein, in (a), the plastic film is fed onto the first roll while kept at a 1.0 to 2.5 N/cm tension.

3. The manufacturing method according to claim 1, wherein the resin intermediate film comprises a plasticized polyvinyl acetal-based resin as a main component.

4. The manufacturing method according to claim 1, wherein, in (a), the resin intermediate film is fed onto the second roll while kept at a 0.04 to 0.3 N/cm tension.

5. The manufacturing method according to claim 1, wherein the resin intermediate film has a 0.3 to 0.8 mm thickness.

6. The manufacturing method according to claim 1, wherein the resin in the plastic film is polyester.

7. The manufacturing method according to claim 1, wherein the plastic film has a 25 to 200 μm thickness.

8. The manufacturing method according to claim 1, wherein surfaces of the first roll and the third roll are made of metal, and surfaces of the second roll and the fourth roll are made of rubber.

9. The manufacturing method according to claim 1, wherein the plastic film is an infrared reflective dielectric multilayer film in which a layer made of a resin having a high refractive index and a layer made of a resin having a low refractive index are alternately laminated, or an infrared reflective film-added plastic film having an infrared reflective film on one surface of a film-shaped plastic substrate.

10. A method for producing a laminated glass, the method comprising:
    bonding a pair of glass substrates via a composite film as an intermediate bonding layer,
    wherein the composite film is obtained by the manufacturing method according to claim 1.

* * * * *